United States Patent Office 3,714,341
Patented Jan. 30, 1973

3,714,341
PROCESS FOR THE PRODUCTION AND RECOVERY OF LEAD SULPHATE
Robert Alfred Dewar, Ashburton, Victoria, and Erwin Gunther Walliczek, Beaumaris, Victoria, Australia, assignors to Imperial Chemical Industries of Australia and New Zealand Limited, Melbourne, Victoria, Australia
No Drawing. Filed May 18, 1971, Ser. No. 144,632
Claims priority, application Australia, June 1, 1970, 1,370/70
Int. Cl. C01g 31/20, 31/16
U.S. Cl. 423—559                3 Claims

ABSTRACT OF THE DISCLOSURE

A process for the extraction and recovery of lead sulphate from ores or process residues wherein the reagents and solvent system used are recovered and reused with high efficiency.

---

This invention relates to the extraction of metal compounds from metal bearing materials and more particularly to the extraction and recovery of lead values especially lead sulphate from minerals or lead bearing materials.

Lead sulphate is a valuable material and may be prepared from other lead compounds to yield the sulphate form. Thus lead carbonate may be treated with sulphuric acid to yield lead sulphate. Lead sulphate occurs naturally as the mineral anglesite in certain ores, and lead residues in zinc sulphide ores remain as lead sulphate when the ores are roasted and extracted with water or sulphuric acid for the recovery of zinc. The lead in an ore is associated with a matrix commonly known as gangue and when the proportion of lead to gangue is so low that slag problems forbid the economic smelting of the residues for lead recovery and beneficiation by conventional means is impracticable, the residues often must be discarded as of no economic value. Thus for example simple aqueous extraction of lead sulphate in an ore in normally impossible due to its low solubility in water.

It is known that lead sulphate may be solubilized by means of concentrated brines as proposed in U.S. Bureau of Mines Bulletin 157, 1918; and in Dutch patent application 6610344. It is also known to solubilize lead sulphate by use of aqueous solutions of ammonia and ammonium sulphate as proposed in Australian Patent 293,-939. Whilst these methods solve the problem of separating the lead from the residues there is some economic difficulty in the subsequent recovery of the lead from the solution in usable form. The difficulty arises from the consumption of additional reagents in stoichiometric relationship to the lead for the precipitation of the lead salt from the solution and to recover it again in solid form.

Thus it has been proposed to precipitate the lead from pregnant brine solutions by adding stoichiometric amounts of bases such as sodium hydroxide or carbonate, and calcium hydroxide. These reagents precipitate the lead as e.g. hydroxide, carbonate, oxychloride or basic sulphate. The consumption of such basic reagents adds appreciably to the cost of the overall operation. In Australian Patent 293,939, evaporation of the free ammonia precipitates the lead as basic sulphate, the remainder of the sulphate ion forming ammonium sulphate. Thus ammonia is consumed in a stoichiometric proportion, and although the by-product ammonium sulphate can be recovered for sale, the application of this method would not in all situations be free of economic difficulties.

On cooling hot saturated solutions of lead sulphate in chloride brine a portion of the lead burden is precipitated as lead chloride. To reconstitute the solvent brine for reuse it would be possible to add calcium chloride, thus precipitating the sulphate ion and restoring the chloride lost in the precipitate. Here again a reagent is consumed in stoichiometric proportion, and in addition, in the present state of the art, the smelting of lead chloride would present some difficulties.

It is an objective of this invention to provide a process for the extraction and recovery of lead sulphate in which the reagents used, including the solvent, are recovered and reused with high efficiency.

A further objective is to provide a solvent system of better characteristics than hitherto proposed for the extraction and recovery of lead sulphate.

In accordance with this invention we provide in a process comprising the steps of (1) preparing a solution of lead chloride by dissolving lead sulphate contained in ore or process residues in hot concentrated chloride brine; (2) separating the solution so formed from insoluble gangue or other residue; (3) forming a precipitate of lead chloride by cooling said solution and separating said lead chloride precipitate from the residual lean brine solution; the improvement which comprises (4) reacting the said lead chloride precipitate with water and calcium sulphate to produce a solution of calcium chloride and a precipitate of lead sulphate, separating said solution from said precipitate and recovering the said lead sulphate precipitate; (5) reacting said calcium chloride solution, optionally concentrated, obtained in step (4) with the lean brine solution of step (3) to precipitate calcium sulphate and to regenerate the chloride brine; and (6) recycling said chloride brine, optionally after evaporation or concentration, for reuse in the further extraction of lead sulphate as under steps (1) to (5) using the calcium sulphate obtained in step (5) to perform the reaction of step (4).

It is surprising that solid calcium sulphate, and lead chloride solution can co-exist in the presence of strong brine without any reaction between them, yet when calcium sulphate and solid lead chloride are removed from the brine and re-suspended in water they can be made to react almost quantitatively to give a precipitate of lead sulphate and a solution of calcium chloride.

We have discovered, however, that there is a limit to the concentration of calcium chloride which can co-exist in equilibrium with solid lead sulphate. This limiting concentration is at or close to 50 grams of calcium chloride (as $CaCl_2$) per litre of solution, apparently independent of temperature in the practical range. Any attempt to achieve a higher concentration of calcium chloride results in a reversion to calcium sulphate and a restoration of the calcium chloride concentration to the above limit.

It appears that calcium chloride solutions should themselves be regarded as lead-complexing brines, and that the limiting concentration of 50 g./l. corresponds to an invariant point on a phase diagram, in accordance with the principles of the Gibbs Phase Rule, at which point the solid phases, lead sulphate, lead chloride and calcium sulphate co-exist with a solution of calcium chloride which is saturated with the solid phases and is of uniquely defined composition in all respects. This phase system has not, as far as we are aware, been studied previously.

The discovery of this limiting calcium chloride concentration is a matter of considerable importance in the practice of our invention, since it dictates the most efficient amount of water to add to the mixture of calcium sulphate and lead chloride. If to little water is added the metathesis is incomplete and calcium sulphate is lost in the lead sulphate product. If to much water is added the metathesis can be completed but more water than is necessary must eventually be evaporated, thus adding to the cost of the whole operation.

In practice it is arranged that the relative amounts of calcium sulphate and lead chloride subjected to the metathesis reaction are in either stoichiometric ratio, or with a small excess of lead chloride such that complete reaction of the calcium sulphate is assured, but not such a large excess that the excess lead chloride cannot be easily removed from the lead sulphate product by hot water washing.

Ancillary to the practice of our invention, but essential for the best practical results, is the choice of a solvent brine system with the following characteristics:

(1) The chloride salt used to form the brine should be cheap and readily available.

(2) The brine when hot should have a high solvent power for lead sulphate.

(3) On cooling a hot solution of lead sulphate in the brine a large proportion of the lead burden should be precipitated as lead chloride.

(4) On reconstituting the brine by addition of calcium chloride to remove sulphate ion, and evaporating to restore the brine to full concentration for re-use, the supersaturation of residual dissolved calcium sulphate should be of such an amount and nature that on re-use of the brine for further lead sulphate extraction the residual calcium sulphate should remain in solution and not be precipitated and lost in the gangue.

Another disadvantage of calcium sulphate precipitation in the lead sulphate dissolution operation is that the rate of dissolution of the lead sulphate is reduced by occlusion phenomena.

We have tried several chlorides for solvent brine formation, including those of potassium, ammonium, sodium, lithium and magnesium, the brines being prepared by dissolving said chlorides in water.

Of these only magnesium chloride is satisfactory in all respects. Potassium chloride has low solvent power. Ammonium and sodium chlorides have moderate solvent power but fail with respect to the precipitation of calcium sulphate from supersaturated solution. Lithium chloride is of course relatively expensive. These chlorides are within the scope of our invention as solvent-forming substances, but our preferred salt is magnesium chloride, which uniquely satisfies all the criteria enumerated above.

Zinc and ferric chlorides have no solvent power for lead sulphate, and zinc salts depress the solubility of lead sulphate in solvent brines.

Accordingly we provide a process as hereinbefore described wherein the brine carrying sulphate ion derived from lead sulphate which is to react with calcium chloride is an aqueous solution of magnesium chloride.

Accordingly we also provide a process as hereinbefore described wherein the brine carrying sulphate ion derived from lead sulphate which is to react with calcium chloride is an aqueous solution of at least one salt selected from the group consisting of the chlorides of potassium, sodium, lithium and ammonium.

It is preferred that the chloride brine should be a saturated or nearly saturated solution at room temperature of an inorganic chloride in water. Other concentrations of solution may be used, but these are less preferred. Thus when a solution containing an amount of inorganic chloride in excess of that required to saturate the solution at room temperature is used, the solvent power of the solution at elevated temperatures is greater than that of a saturated solution comprising the same ingredients; however, on cooling to room temperature difficulties are experienced. For example, the solution may become too viscous to filter easily or the excess chloride salt precipitated tends to contaminate the product. In the instance where a relatively dilute solution is used, the solvent power of the solution is less and larger volumes of solution need to be used to dissolve the same amount of lead sulphate than with a saturated solution, thus necessitating more equipment and greater volumes of water, and resulting in greater cost in operating the process.

It is convenient to add the lead-bearing material to the aqueous brine when the latter is at an elevated temperature, preferably at temperatures above 100° C. and more preferably at the boiling point of the aqueous brine solution at atmospheric or superatmospheric pressures. Whilst lower temperatures may be used, the use of elevated temperatures enhances the degree of solubility of the lead-bearing material per unit volume of brine solution and thus gives a greater amount of lead chloride which may be precipitated from a given volume of brine solution.

We have found that the precipitation of the calcium sulphate requires certain conditions for satisfactory results. Whilst the precipitation may be done at or near the boiling point, the crystals of calcium sulphate under these conditions are coarser and somewhat more readily filtrable. However, there remains some residual supersaturation which is relieved when the reconstituted solvent is re-used for lead sulphate dissolution.

If, however, the precipitation is commenced at 70° C. or below, supersaturation phenomena are reduced, and are avoided when the solvent salt is magnesium chloride. A much lower temperature of precipitation is undesirable because the crystals obtained are fine and difficult to filter and dewater. A range of temperature between 70 and 50° C. is suitable.

Accordingly we provide a process as hereinbefore described wherein the reaction between calcium chloride and lead sulphate in the presence of a chloride brine is performed at a temperature in the range from 50° C. to the boiling point of the chloride brine preferably in the range from 50 to 70° C.

The lean brine may be concentrated to any desired level. However, it is preferred that the brine be concentrated to a degree that the concentration of solute in the brine is just below or at a level to give a saturated solution of the solute at room temperature.

Reconstitution of the solvent brine requires that zinc if present should be controlled. Above 1% w./v. of zinc in solution the solvent power for lead sulphate begins to be appreciably depressed. Purging the solution of zinc, and recovery of the latter, may be conveniently done by adding lime to the lean brine and precipitating the remaining lead in solution along with the zinc as basic salts. The zinc in the precipitate would be recoverable by sulphuric acid leaching, and the residue could then be returned to the lead circuit to recover the lead sulphate.

As mentioned hereinbefore one of the objects of the invention is to provide a process wherein the reagents used are recovered and reused with high efficiency. In essence, once the process has been started it is only necessary to supply the raw material ore or metal bearing material and water to the system and to supply sufficient heat to evaporate such water as is no longer required and even this water may be recovered and returned to the system if desired. The calcium salts are regenerated within the system and the only additions of these which need to be made are those resultant from mechanical losses.

In plant practice the first calcium sulphate precipitation with virgin brine is preferably done with an excess of calcium chloride over and above that just required to desulphate the liquor for the next cycle. It is preferable to proceed to complete or nearly complete desulphation on the first pass so as to avoid additional and unrequired further precipitation of calcium sulphate during the washing step. After the first cycle the calcium chloride additions must be as closely as possible equivalent to the fresh lead sulphate brought into circuit on each cycle. The calcium chloride for these additions can be supplied quantitatively by the metathesis reaction, apart from a small loss of chloride in the final product. The metathesis referred to is the double decomposition of lead chloride and calcium sulphate to form lead sulphate and calcium chloride.

Before performing the metathesis it is advisable to remove the solvent brine from the mixed precipitate since the presence of appreciable chloride from the solvent brine would limit still further the concentration of calcium chloride obtainable.

To wash the mixed precipitates of lead chloride and calcium sulphate without inducing premature induction of the metathesis reaction it is best to use a 50 g./l. calcium chloride solution from a stock of the same concentration derived from previous metatheses. This procedure permits the removal of the solvent brine without induction of the metathesis, and the washings are returned to circuit in the next calcium sulphate precipitation step, any calcium chloride carried through being used as part of the total calcium chloride required for that step.

The combined precipitates, wet with 50 g./l. calcium chloride solution, are now reacted with the calculated quantity of fresh water required to produce a 50 g./l. calcium chloride solution by metathesis. The metathesis may be done by adding the requisite water to a suspension of the solids in warm, stock calcium chloride solution (50 g./l.) or more simply by dropping the precipitates en masse into the calculated quantity of water at about 70° C. and then boiling for up to ½ hour.

A final ball milling of the final lead sulphate suspension may be found beneficial in reducing the chloride content of the lead sulphate product still further.

The final product lead sulphate is filtered off, and washed with aliquots of hot water. This water is conveniently the water required for the metathesis of the next cycle, thus conserving the addition of fresh water to the system and minimising the evaporative load.

We have also found in the operation of our process that other metals if present may be extracted from our lead bearing materials. Thus for example copper and silver may be removed from zinc lead concentrates, by means of our process.

The lead sulphate obtained by our process is a useful product used as a stabilizer in the formulation of plastics materials. It is also useful as a pigment. Our process is also useful in that it provides a means of extracting lead sulphate from ores or other materials which could not be smelted economically. The extracted lead sulphate on the other hand is in a form whereby it may be smelted and the lead recovered therefrom.

It will be realized that the practice of our invention may be performed in various ways as for example by continuous, semi-continuous or batch operation as is convenient.

The following examples illustrate the practice of our invention but should not be construed as limiting.

EXAMPLE 1

This example demonstrates the solvent power of an aqueous magnesium chloride solution for lead sulphate.

One litre of a solution of magnsium chloride in water, saturated at room temperature (350 g. $MgCl_2$ per litre of solution) was brought to boiling point and lead sulphate powder was added in increments until no further solution was obtained. The addition of the lead sulphate and a little evaporation caused the boiling point to rise to 115° C., at which point 120 g. $PbSO_4$ had been added.

On cooling to 35° C. lead chloride equivalent to 80 g. $PbSO_4$ crystallized out. This indicates the high pass yield obtained with magnesium chloride brine.

EXAMPLES 2 TO 5 INCLUSIVE

The process of Example 1 was repeated but the solution of magnesium chloride of that example was replaced by aqueous solutions saturated at room temperature of the chlorides set out in Table 1. The amount of lead sulphate which could be dissolved in the boiling solution is also set out in Table 1.

TABLE 1

| | Chloride used | Amount of lead sulphate dissolved, g./l. |
|---|---|---|
| Example: | | |
| 2 | Sodium | 55 |
| 3 | Ammonium | 55 |
| 4 | Potassium | 20 |
| 5 | Lithium | 20 |

EXAMPLE 6

90 grams of an ore residue assaying 30.3% $PbSO_4$ (derived from a finely-disseminated zinc-lead concentrate which had been subjected to a sulphating roast and then leached for zinc with dilute sulphuric acid) was added to 230 ml. of 350 g./l. $MgCl_2$ brine and boiled for 3 minutes, when the boiling point was 115° C. The mixture was filtered hot under pressure and the cake washed with two displacement washes of hot water.

The cake was dried, and weighed 63.4 g., indicating a 97.6% extraction of lead sulphate on assay expectation. X-ray fluorescence analysis of the residue indicated negligible lead retention.

The mother liquor was distinctly coloured with copper and this copper and a trace of silver were removed by cementation with lead sponge.

This example shows an additional advantage of hot magnesium chloride extraction, in that copper and silver values which had resisted leaching in the zinc circuit were shown to be recoverable.

The yield of lead chloride obtained on cooling to 35° C. was 17 grams and only a little more was obtained on further cooling.

EXAMPLE 7

A solution of lead sulphate in magnesium chloride brine, prepared after the manner of Example 1 and containing 120 g./l. $PbSO_4$ was treated with calcium chloride solution (500 g./l. $CaCl_2$) commencing at 70° C., and adding the calcium chloride over 20 minutes with constant stirring. The amount of calcium chloride added was equivalent to 80 g./l. $PbSO_4$. The calcium sulphate precipitated was in the form of fine needles. The solution was finally cooled to 35° C. and the combined precipitates of calcium sulphate and lead chloride were filtered off.

The filtrate was reheated to boiling point and evaporated to the original volume. It was found capable of resaturation to a total of 120 g./l. $PbSO_4$ without signs of calcium sulphate precipitation.

EXAMPLE 8

This example quantifies a series of runs simulating conditions for full scale operation of the complete cycle using a single batch of magnesium chloride.

Several runs were performed in a preliminary exercise to accumulate sufficient system-generated calcium chloride solution to operate the cyclic system without any additional importation of fresh calcium chloride. The magnesium chloride solvent brine was used to dissolve lead sulphate, the solution was desulphated with pure calcium chloride, and the calcium sulphate and lead chloride mixed precipitates were metathesised. This was repeated until the system-generated calcium chloride was in hand in sufficient quantity.

Runs 1 to 4 were then performed, as quantified in Table 2 below. The quantity of lead sulphate dissolved on each occasion was varied to demonstrate the flexibilty of the system. The conditions were as follows:

Solvent: 1 litre 350 g./l. $MgCl_2$ (restored to volume by evaporation)

Dissolution temperature: 115° C.

Precipitation of $CaSO_4$: Commenced at 70° C., using system-generated $CaCl_2$ solution concentrated to 400 g./l.

Final temperature: 35° C.

Precipitates washed with unconcentrated system-generated $CaCl_2$ solution (ca. 50 g./l.).

Metathesis

Run 1.—By adding water to the suspension of the mixed solids in 50 g./l. $CaCl_2$ with stirring at 70°, finally bringing to the boil, filtering and washing with hot water.

Runs 2 and 3.—By adding the precipitates (wet with 50 g./l. $CaCl_2$) en masse into water at 70°, and then boiling for ½ hour.

Run 4.—As for 2 and 3 but in addition shaking the lead sulphate suspension with glass beads for ¼ hour.

The lead sulphate precipitates were analysed for calcium and chloride.

In all cases the calcium content was barely detectable (less than 0.1%). The chloride contents (as $Cl^-$) were low, showing some possible benefits from changes of technique from runs 2, 3 and 4.

TABLE 2

| Run | $PbSO_4$ dissolved, g. | $PbCl_2$ ppt. expected, g. | $PbCl_2$+ $CaSO_4$ expected, g. | $PbCl_2$+ $CaSO_4$ found, g. | $H_2O$ used, ml. | $CaCl_2$ concn. found, g./l. | $PbSO_4$ recovered, g. | $Cl^-$ in $PbSO_4$, percent w./w. |
|---|---|---|---|---|---|---|---|---|
| 1 | 74.0 | 68.0 | 101 | 99 | 540 | 46.5 | 71 | 0.53 |
| 2 | 65.0 | 59.6 | 94 | 92.5 | 460 | 48.0 | 62 | 0.30 |
| 3 | 60.0 | 54.2 | 91.4 | 91.3 | 432 | 49.5 | 57 | 0.32 |
| 4 | 61.8 | 56.5 | 84.0 | 84.6 | 451 | 49.0 | 60 | 0.15 |

In all cases the calcium chloride concentrations obtained in the metathesis were close to the optimum of 50 g./l.

In no case, on recharging the reconstituted magnesium chloride solution, was any sign of calcium sulphate deposition observed.

The total yield of $PbSO_4$ was a few percent less than the intake. This would be accounted for by fluctuation in the recycling lead chloride and would balance out eventually in a continuous process.

Concentration of the 50 g./l. calcium chloride, and of the spent mother liquor for recycling, could be done in multiple effect evaporators to conserve heat on a commercial basis.

We claim:

1. In a process comprising the steps of (1) preparing a solution of lead chloride by dissolving lead sulphate contained in ore or process residues in hot concentrated magnesium chloride brine; (2) separating the solution so formed from insoluble gangue or other residue; (3) forming a precipitate of lead chloride by cooling said solution and separating said lead chloride precipitate from the residual lean brine solution; the improvement which comprises (4) reacting the said lead chloride precipitate with water and calcium sulphate to produce a solution of calcium chloride and a precipitate of lead sulphate, separating said solution from said precipitate and recovering the said lead sulphate precipitate; (5) reacting said calcium chloride solution obtained in step (4) with the lean brine solution of step (3) to precipitate calcium sulphate and to regenerate the chloride brine; and (6) recycling said chloride brine for reuse in the further extraction of lead sulphate as under steps (1) to (5), using the calcium sulphate obtained in step (5) to perform the reaction of step (4).

2. A process according to claim 1 wherein step (5) is performed at a temperature in the range from 50° C. to the boiling point of the magnesium chloride brine.

3. A process according to claim 1 wherein step (5) is performed at a temperature in the range from 50 to 70° C.

References Cited

UNITED STATES PATENTS

| 1,647,426 | 11/1927 | Witter et al. | 23—97 |
| 1,977,648 | 10/1934 | Sessions | 23—97 X |
| 2,109,755 | 3/1938 | Sessions | 23—97 X |

FOREIGN PATENTS

| 22,615 | 1910 | Great Britain | 23—97 |
| 365,964 | 1/1932 | Great Britain | 23—97 |

EDWARD STERN, Primary Examiner

U.S. Cl. X.R.

423—494, 497, 555